United States Patent
Gupta et al.

(10) Patent No.: US 8,909,703 B2
(45) Date of Patent: Dec. 9, 2014

(54) SYSTEM AND COMPUTER PROGRAM PRODUCT FOR FACILITATING A REAL-TIME VIRTUAL INTERACTION

(75) Inventors: Manish Gupta, New Delhi (IN); Pankaj Dhoolia, Uttar Pradesh (IN); Narendran Sachindran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1842 days.

(21) Appl. No.: 12/018,869

(22) Filed: Jan. 24, 2008

(65) Prior Publication Data

US 2009/0193079 A1    Jul. 30, 2009

(51) Int. Cl.
*G06F 15/16* (2006.01)
*G06Q 10/10* (2012.01)

(52) U.S. Cl.
CPC ..................................... *G06Q 10/10* (2013.01)
USPC ......................................................... 709/204

(58) Field of Classification Search
USPC ......................................................... 709/204
See application file for complete search history.

(56) References Cited

U.S. PATENT DOCUMENTS

| | | | |
|---|---|---|---|
| 6,889,250 B2 | 5/2005 | Bezos et al. | |
| 7,644,144 B1 * | 1/2010 | Horvitz et al. | 709/223 |
| 2001/0037325 A1 | 11/2001 | Biderman et al. | |
| 2003/0059115 A1 | 3/2003 | Nakagawa | |
| 2004/0034706 A1 | 2/2004 | Cohen et al. | |
| 2005/0210102 A1 | 9/2005 | Johnson et al. | |
| 2005/0289452 A1 * | 12/2005 | Kashi et al. | 715/512 |
| 2006/0053389 A1 * | 3/2006 | Michelman | 715/775 |
| 2007/0050708 A1 * | 3/2007 | Gupta et al. | 715/513 |
| 2007/0150426 A1 * | 6/2007 | Asher et al. | 706/20 |
| 2007/0203940 A1 | 8/2007 | Wang et al. | |
| 2008/0222295 A1 * | 9/2008 | Robinson et al. | 709/227 |

OTHER PUBLICATIONS

Sidler et al., "Collaborative Browsing in the World Wide Web," Proceedings of the 8th Joint European Networking Conference, Edinburgh, May 12-15, 1997.
Tutorial—How to Use Me dium, http://me dium.com/tutorial, downloaded on Jan. 11, 2008.

* cited by examiner

*Primary Examiner* — Shripal Khajuria
(74) *Attorney, Agent, or Firm* — Ryan, Mason & Lewis, LLP

(57) ABSTRACT

Techniques for facilitating a real-time virtual interaction between two or more users are provided. The techniques include extracting a dynamically changing context from two or more users, wherein the context comprises at least one of user-provided information and one or more items related to at least one of current activity and past activity of the two or more users, analyzing the context from each user to create a classification for each user, comparing the classification for each user with a classification for each additional user, wherein comparing comprises ordering each user in terms of closeness to each additional user, and using the ordering of each user in terms of closeness to each additional user to facilitate a real-time virtual interaction between two or more users. Techniques are also provided for generating a database of one or more user classifications.

13 Claims, 11 Drawing Sheets

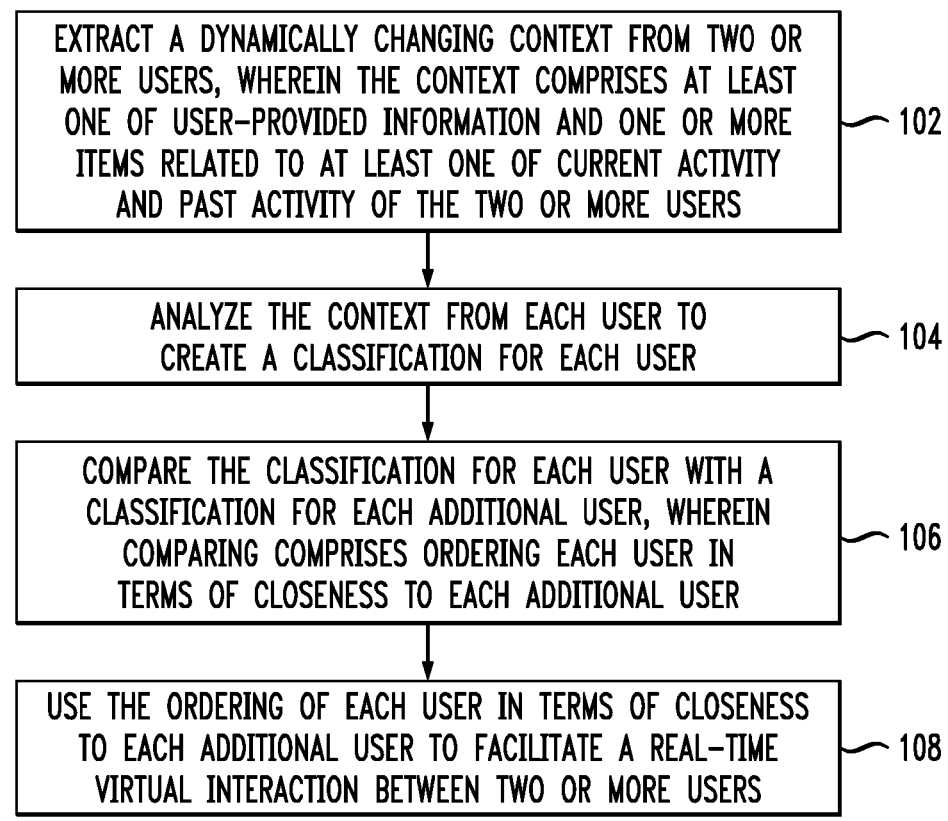
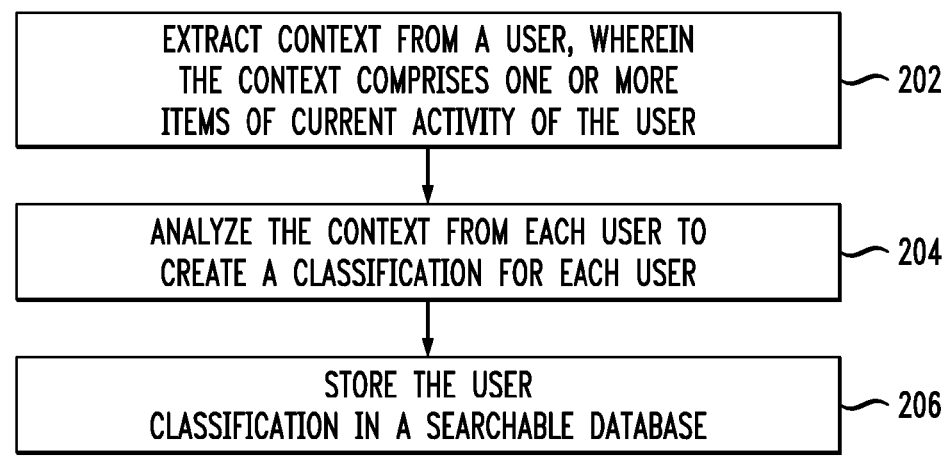

SYSTEM AND COMPUTER PROGRAM PRODUCT FOR FACILITATING A REAL-TIME VIRTUAL INTERACTION

CROSS-REFERENCE TO RELATED APPLICATION(S)

The present application is related to a commonly assigned U.S. application entitled "Method for Facilitating a Real-Time Virtual Interaction," identified by U.S. patent Ser. No. 12/018,838, and filed on even date herewith, the disclosure of which is incorporated by reference herein in its entirety.

FIELD OF THE INVENTION

The present invention generally relates to information technology, and, more particularly, to virtual interaction.

BACKGROUND OF THE INVENTION

In the real world, while performing various activities, individuals also have awareness of other entities (people, etc.) close to them with whom they can potentially collaborate on the spot. For example, when going to a mall, one may quickly ask another person close by for the directions to the mall, or to a specific store.

In a virtual world, a program such as, for example, SecondLife, proposes to recreate the real world-like environment but in a virtual setting. In the virtual setting, individual's avatars perform different activities (for example, browsing information, walking, flying, buying, etc.) while seeing other people and/or objects close to them that they may have never come across before. As such, this opens up tremendous opportunities for on-the-spot collaboration between entities.

A challenge facing enterprises exists, however, in using collaboration as a tool for innovation. Specifically, challenges can exist, for example, in building effective communities, and creating effective collaboration between employees, customers, and partners.

Also, as appreciated by one skilled in the art, real-time interaction (for example, ST, Yahoo Messenger, Flixter, etc.) differs from asynchronous interaction (for example, electronic mail (e-mail), web-logs (blogs), wikis, jams, Orkut, etc.). For example, real-time collaboration recaptures the immediacy of face-to-face communication and more easily establishes trust and rapport among team members. Also, real-time interaction (as compared to asynchronous interaction) potentially enables heightened productivity, faster response to customers, and greater agility in capturing business opportunities.

Exemplary existing approaches also, for example, only send a uniform resource locator (URL) to the server side for computation of distance, as opposed to also incorporating the user's current activity at the user's end. Existing approaches also only talk in terms of web pages and how the uniform resource identifiers (URIs) are sent from the user's browser to their server side for computation of distance between any two users. Such approaches cannot handle the situation where the user's browser is displaying dynamic and/or personalized content which is changing based on user's actions. If a user looks at a web having asynchronous JavaScript and XML (AJAX) based pages, the main URL may not be indicative of the content in the page.

In existing approaches, if only the URL is sent to the server-side, then the server cannot create the context that the user currently has simply by a downloading the page because it is no longer a page download but may be a mash-up of the information from different URLs, and this information may change in non-deterministic ways as the user interacts with a mash-up applications. Further, the users may also personalize the web pages or mash-ups. If the server in existing approaches wants to get the personalized web page or mash-up page, then it has to (disadvantageously) have the credentials of the user and access the page on user's behalf.

Other existing approaches look at the URLs being executed by users by performing all the distance-based calculations at the web server end. The distance or similarity being computed is for finding similarity in navigation patterns or search strategies, as opposed to looking for similarities in activities by actually extracting the content at the client/user end (as opposed to the server end). In such existing approaches, the focus is on navigation patterns or search strategies, and consequently such approaches will miss bringing the above two people together.

Existing approaches also include mappings disadvantageously done a priori based on keywords on a web page. Other approaches include finding similarity between any two users by knowing which URLs a particular user is visiting, and comparing that sequence of URLs to other users' sequence of URLs visited to find a closeness measure between any two users. Such approaches do not consider non-web based applications, and the client side is limited to providing the URL information but not the content of the page.

None of the middleware for collaboration (like blogs, wikis, jams, etc.) in existing approaches supports same-time-type real-time presence information having the infrastructure for bringing the correct people and/or entities together. As a result, an on-the-spot collaboration-promoting web would be advantageous.

SUMMARY OF THE INVENTION

Principles of the present invention provide techniques for facilitating a real-time virtual interaction.

An exemplary method (which may be computer-implemented) for facilitating a real-time virtual interaction between two or more users, according to one aspect of the invention, can include steps of extracting a dynamically changing context from two or more users, wherein the context comprises at least one of user-provided information and one or more items related to at least one of current activity and past activity of the two or more users, analyzing the context from each user to create a classification for each user, comparing the classification for each user with a classification for each additional user, wherein comparing preferably involves ordering each user in terms of closeness to each additional user, and using the ordering of each user in terms of closeness to each additional user to facilitate a real-time virtual interaction between two or more users.

In an embodiment of the invention, an exemplary method for generating a database of one or more user classifications includes the following steps. Context is extracted from a user, wherein the context preferably has one or more items of current activity of the user. The context from each user is analyzed to create a classification for each user. Also, the user classification is stored in a searchable database.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a flow diagram illustrating techniques for facilitating a real-time virtual interaction between two or more users, according to an embodiment of the present invention;

FIG. 2 is a flow diagram illustrating techniques for generating a database of one or more user classifications, according to an embodiment of the present invention;

DETAILED DESCRIPTION OF PREFERRED EMBODIMENTS

Figure 3:
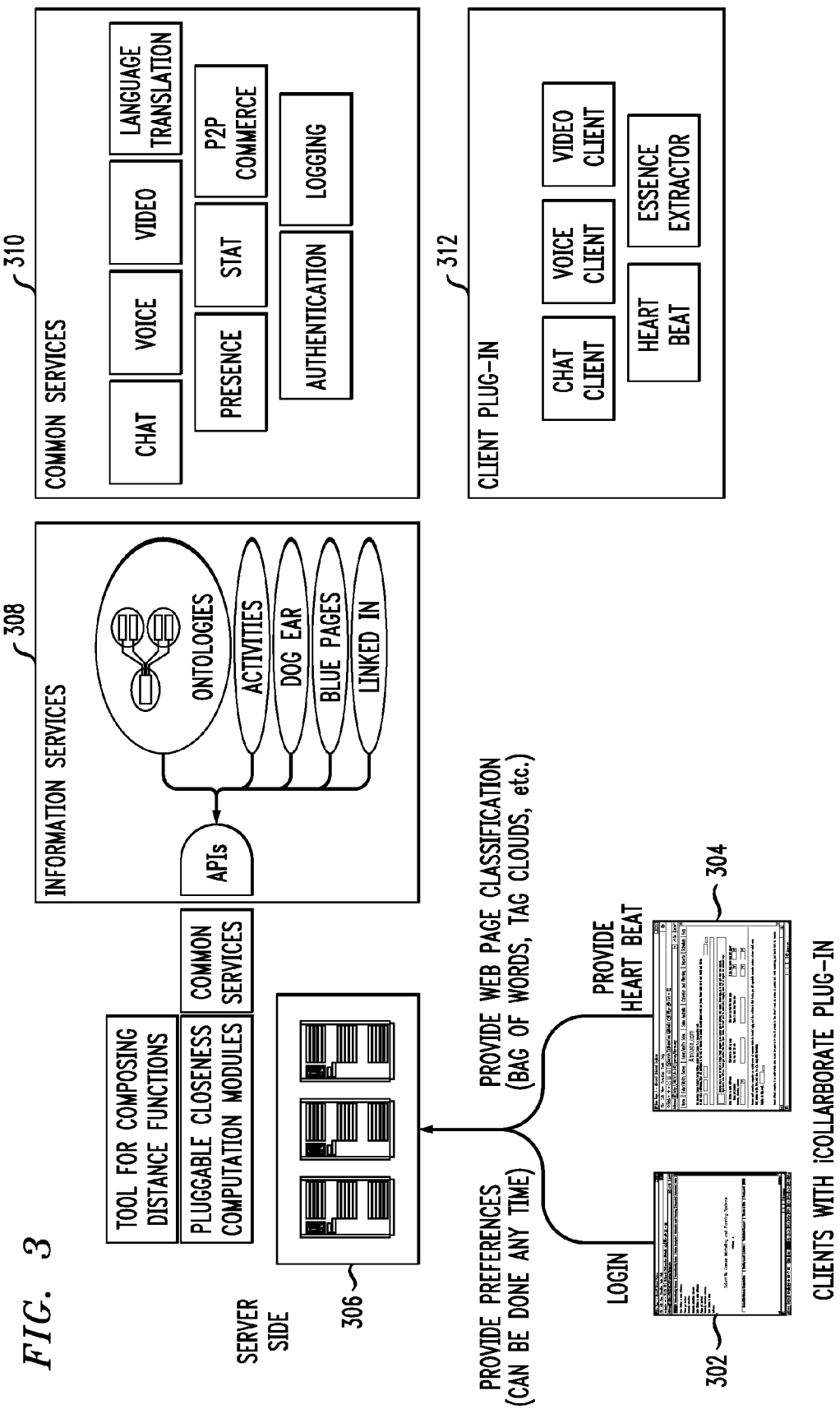
FIG. 3 is a diagram illustrating exemplary architecture, according to an embodiment of the present invention.

Principles of the present invention include a pervasive and rich user experience in web surfing at an enterprise or worldwide web (WWW) scale. Additionally, principles of the invention include ad hoc yet purpose-specific real-time social networking.

The techniques described herein include, for example, creating an extensible framework with a plug and play paradigm, dynamically adding new classification extractors, distance computation modules, etc., and providing tools for composing new distance functions and classification extractors. Also, control can be provided to a user so that the user is assured of the privacy of the data. Additionally, a computation at the client side should not interfere with the user's activities One or more embodiments of the present invention include efficient realtime (for example, incremental and/or non-incremental) algorithms to compute closeness metrics between people. Closeness metrics can, for example, capture useful relationships between people and determine which relationships are useful in a given situation and/or context. Also, one or mote embodiments of the invention include techniques to maintain and re-compute three-dimensional (3D) state information at the server side and tender at the client side.

In one or mote embodiments of the present invention, users are able to get real-time presence information about other "closely" related users with whom they can (if they so wish) get into real-time conversations. Jams can, for example, have moderators who may define their own distance functions to bring people with a given set of ideas into a common forum. Also, this can, for example, be a 3D room.

With commerce sites, shoppers are able to learn from the presence of other people during shopping, thus assisting in making a selection decision. Also, one or more embodiments of the invention can include auction sites, wherein during the last few minutes of an open cry auction, the electronic auctioneer (e-auctioneer) may use the 3D room facility to create a "brick and mortar" type of auction experience to bring increased euphoria in the bidding process.

As described herein, one or more embodiments of the present invention make traditional web-surfing more like an experience of the above worlds, wherein you can, for example, see the physical presence of people and/or objects, communicate with people and/or objects, have avatars and can navigate 3D environments. In the web surfing experience detailed herein, a user can, for example, meet other individuals that the user may not have met before, from across the globe, and not be limited to just a web site. As such, a user can meet people with whom the user has a higher chance of a meaningful collaboration, by making them aware of each others presence in real-time. The entities can initiate communication between each other via, for example, instant message (IM), chat, voice, etc.

Principles of the invention include relating people (or web-based entities) doing similar activities based on context extraction of the user's current activity at the user's end, and sending the context to the server side for computing distance between any two users. Additionally, because the context extraction works at the client/user end, it is able to extract the context as it changes and therefore will work for even, for example, AJAX based pages or mash-ups (because as the state of an AJAX based page changes, one or more embodiments of the present invention can create a new context and update the server-end), and personalized pages without having a need to send the credentials (for example, log-in and password) to the server side.

Also, as described herein, context extraction can be introduced at the client end in different domains (such as, for example, software development environments and tools, working on your email client like lotus notes, or creating a work document, etc.) where the uniform resource locator (URL) passing approach (for example) embodiment does not work or scale. One or more embodiments of the invention can bring two web surfers together, who may not have the same navigation pattern or the same search strategies, because their content may be very similar. As an example, a person viewing a page on chess in Wikipedia and another person viewing a news article on Kasparov on a news site may be brought together because the content on both user ends is related to each other because of their connection to the concept of chess.

As such, one or more embodiments of the present invention analyze the content of the current web page that an entity is browsing to create a classification of the web page. This classification is communicated to a server that is receiving such classifications from the users. When the server receives a classification from a user, it compares it with the classifications of the existing users currently online to order them vis-à-vis the user in terms of closeness to other users. As used herein, a classification refers to a detailed model of an entity's collaboration needs and/or potential based on the content, actions and history related to the entity.

Principles of the invention also include embedding the notion of distance in web surfing. A distance function is a notion that defines closeness between any two entities in the virtual worlds. The distance function models this "closeness" as being the usefulness of a person Y to person X if person X were to initiate a collaborative dialogue with person Y.

As an example, in SecondLife (SL), the notion of distance is (roughly) Euclidean. A user can see or hear another person (or object) if that person is close to the user in a Euclidean sense, but that person need not be considered to be "useful" to the user. As used herein, useful refers to the concept that someone who can help a user with, or might have answers for, something that a user may be looking for or is working on. However, as noted herein, principles of the present invention include using the above-generalized notion of "distance" and embed it in the traditional web browsing techniques.

For example, let Tom and John be viewing and/or editing an IBM page (with tag clouds (that is, visual depictions of content tags used on a website) being "software," "technology," "middleware" and "services"), Jerry be viewing a Microsoft page (with tag clouds being "software," "middleware" and "applications"), and Jason be on an India page (with tag clouds being "country" and "software"), all on the Wikipedia website. Let the distance function be:

```
If (SamePage(x,y) > 0),
    then
        (x, y) = (1/Count(TagCloud(page(x)) ∩ TagCloud(page(y)))),
    else
        d(x,y) = 0
End-if
As such:
    D(Tom, John) = 0, D(Tom, Jerry) = 1/2
    D(Tom, Jason) = 1
    D(Jerry, Jason) = 1
```

The above distance function assumes that being on the same page has a greater likelihood of collaboration between any two individuals. Otherwise, if the two people are on different pages, then the degree of meaningful collaboration is, for example, proportional to the number of common "tags" on the two pages. As used herein, tags refer to individual elements of a detailed extract of the classification. It should be appreciated by one skilled in the art that other classifiers (for example, images or any other means) could be used to determine a degree of meaningful collaboration, and such classifiers fall within the scope of the present invention.

In the above example, the classification of a web page was defined as the tag cloud associated with that page (given that for each web page of interest there is a tag cloud). But it is not necessary that the classification be defined as a tag cloud only. In a preferred embodiment detailed herein, the content (text in the paragraphs) of a page is analyzed to construct a frequent-term vector for that page. The frequent-term vector is communicated by each of the clients (including browsers showing the web page) to a server. The server computes the Euclidean distance between the vectors to determine the closeness between the different web-based entities. If the Euclidean distance is found to be small, then the entities are close. The farther the Euclidean distance, the farther the relation between the entities.

A new client moving to a web page will send its classification to the server automatically. The server determines the set of closest other clients to this client's classification vector. At this point, the server may, for example, put a fixed number of the closest other user's in the visibility of the current client, or may choose a policy of putting the user in a dynamic group, as detailed below.

One or more embodiments of the present invention include pluggable client-side plug-ins and server-side distance computation plug-ins in architecture. The server is responsible for collecting contexts from the clients and computing distances between them, as well as using other information bases (for example, ontologies, etc.) to compute distances between any two contexts. The server also maintains the mapping of context to clients and/or users.

Also, one or more embodiments of the invention include monitoring the activity of the client at the client's end, and sending the extracted context to the server-side whenever the context changes. Activities can include, for instance, internet browsing and non web-based activities (for example, writing an e-mail on a lotus notes client, creating a Java class in Eclipse integrated development environment (IDE), etc.).

The techniques described herein can also, for example, consider dynamic pages, personalized pages, and other kinds of applications. One or more embodiments of the invention may also include plug-ins to extract contexts (which are other than just URLs from web pages) from clients, as well as server-side distance computation plug-ins for computing distance functions, taking as input two contexts received from their respective clients. Additionally, as detailed herein, a server-side can leverage ontologies to compute a distance between any two contexts.

The client can, for example, have the capability to customize the context any time during the session, as well as communicate with other clients on a one-to-one basis or create explicit groups within which to communicate. Also, categories or concepts can be automatically created on the server-side based on the received contexts from the clients. Categories or concepts can also be linked with the user profiles to which they are related. Clients, additionally, can explicitly write queries, in the client, a feature provided by the client plug-in and send the queries to the server-side, the server-side associating the received client query (for example, using the client's context and ontologies available) to the available concepts and hence to the other user profiles associated with the concepts.

FIG. 1 is a flow diagram illustrating techniques for facilitating a real-time virtual interaction between two or more users, according to an embodiment of the present invention. Step 102 includes extracting a dynamically changing context from two or more users, wherein the context comprises at least one of user-provided information and one or more items related to at least one of current activity and past activity of the two or more users. The activity can include, for example, participating in a web-log (blog), jam, electronic mail (e-mail), wiki, internet browsing, three-dimensional environments (for example, SecondLife), a commerce site, an auction site, content browsing, content manipulation and/or one or more software development activities. Also, each user can have an avatar.

Extracting context can occur, for example, at one or more domains. Domains can include, for example, software development environments, e-mail, a work document, electronic commerce and/or internet. Extracting context can also include parsing a document object model (DOM) for the current user activity, using the parsed DOM to obtain words of text from the activity, removing each word that conveys no context information, removing each set of equivalent words, computing a count of unique words from the activity, and computing a content vector and normalized term-frequency vector of one or more frequently occurring terms.

Step 104 includes analyzing the context from each user to create a classification for each user. Creating a classification may include analyzing the context of a user activity to construct a frequent-term vector and/or a feature vector for the user activity. Step 106 includes comparing the classification for each user with a classification for each additional user by ordering each user in terms of closeness to each additional user. Step 108 includes using the ordering of each user in terms of closeness to each additional user to facilitate a real-time virtual interaction between two or more users.

The techniques depicted in FIG. 1 can also include providing each user with privacy control. Also, each user can be enabled to communicate with each additional user and navigate one or more three-dimensional (3D) environments. Communication can include, for example, using instant message, chat and/or voice capability. Additionally, one or more embodiments of the invention can include generating a ranking of two or more users for a given context based on a distance function, wherein the distance function depends on a feature vector.

FIG. 2 is a flow diagram illustrating techniques for generating a database of one or more user classifications, according to an embodiment of the present invention. Step 202 includes extracting context from a user, the context including one or more items of current activity of the user. Step 204 includes analyzing the context from each user to create a classification for each user. Step 206 includes storing the user classification in a searchable database.

FIG. 3 is a diagram illustrating exemplary architecture, according to an embodiment of the present invention. By way of illustration, FIG. 3 depicts the elements of clients 302 and 304 with plug-ins, server side 306, information services 308, common services 310 and client plug-in 312. Information services 308 can include, for example, ontologies, activities, social book-marking service, and user information directory services. Common services 310 can include, for example, chat, voice, video, language translation, presence, statistics, peer-to-peer (P2P) commerce, authentication and logging. Also, client plug-in can include, for example, chat client, voice client, video client, heart beat and classification extractor.

A user installs the client plug-in at the time of its first use. The user may give preferences then or at a later time. As depicted in FIG. 3, via the classification extractor, the client plug-in has the capability to analyze the current web document and extract out the "classification" of the document and send it to the server side. The classification of a web document may be, for example, the term frequency, or the tag cloud, or the collection of links from the web document, etc. As described herein, one or more embodiments of the invention can upgrade the classification extractor component at will. Whenever the web document currently loaded in a client's web browser changes, the classification of the changes is also sent to the server side As also depicted by FIG. 3, via heart beat, the plug-in has a component which connects with the server to obtain new presence (and possibly other) information from the server side, sends new classification, etc.

The server side (a plug-in and extensible framework) 306 (which also includes information services 308, common services, tools for composing distance functions, and pluggable closeness computation modules) can, for example, compute views for each of the users logged into the server. The views, besides including basic services such as chat, voice, etc., also include the presence information about the users that are considered "close" to the given user's view. The server side ranks the other users based on their closeness to a given user. Also, the ranking distance functions are pluggable and extensible The server side also provides application programming interfaces (APIs) to other sources of information on the internet (including the intranet) that can help in computing the closeness relationship between the users. Additionally, the server side provides and maintains a state for the users and views (this also allows the support of 3D views), and authenticates the users.

Figure 4:
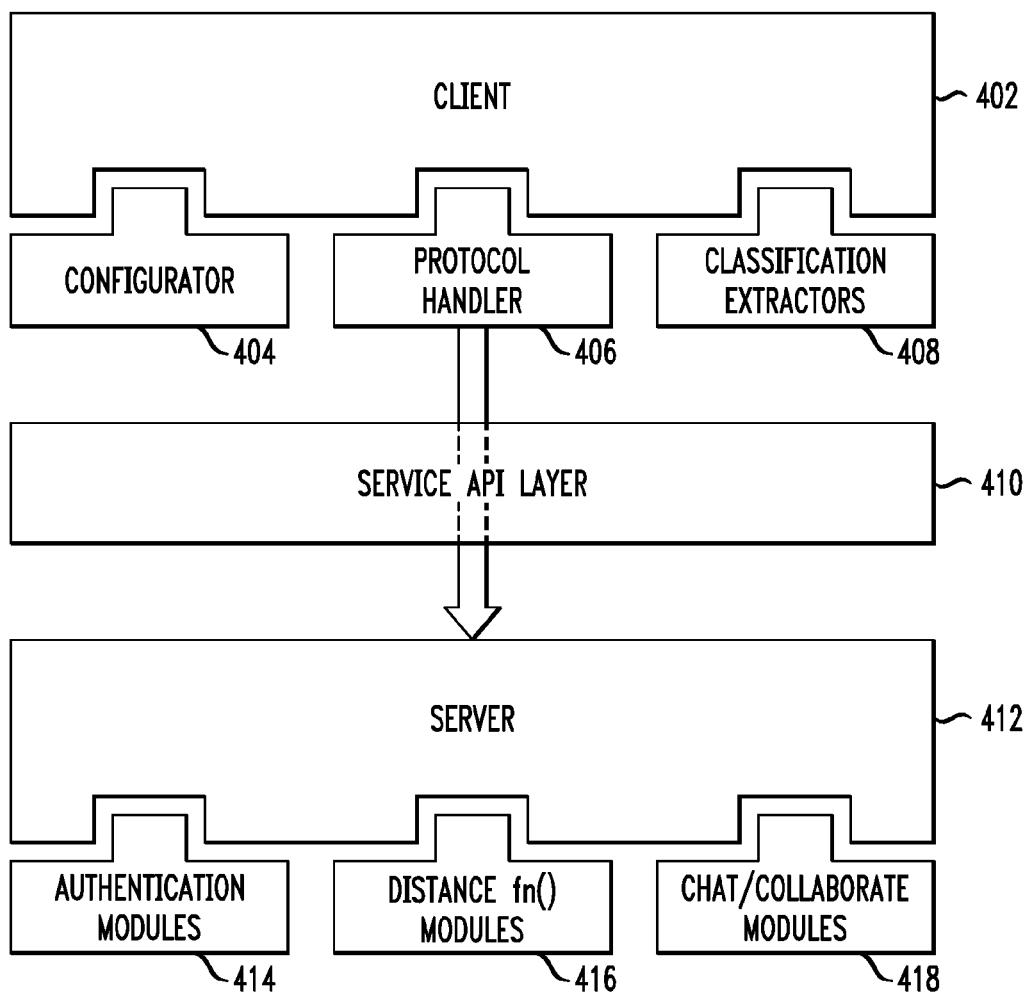
FIG. 4 is a diagram illustrating exemplary architecture, according to an embodiment of the present invention.

FIG. 4 is a diagram illustrating exemplary architecture, according to an embodiment of the present invention. By way of illustration, FIG. 4 depicts the elements of client 402, configurator 404, protocol handler 406, classification extractor 408, service API layer 410, server 412, authentication modules 414, distance function (fn( )) modules 416 and chat and/or collaborate modules 418.

As noted above, a client plug-in is responsible for the extraction of the classification to be sent to the server that, in turn, is responsible for computing distance functions between clients to identify dynamic groups in which to put the different users, creating categories of user groups or categorizing the users into groups. Also, as depicted in FIG. 4, the client element 402 includes three components, the configurator 404, the protocol handles 406 and the classification extractor 408.

The configurator module 404 allows the user to specify preferences. Preferences can include, but are not limited to, switching collaboration mode on/off, configuring browsing patterns to be excluded from collaboration, choosing (and ranking) classification extractor from the ones registered, and registering custom classification extractors.

The protocol handler 406 implements the entire set of interactions with the server 412 using the service API layer 410. Interactions may include, for example, authentication, a browser event push based (for example, getting related or "close" entities), and a server event push based (for example, broadcasting entity relationship changes).

Classification extractors 408 can create a summary of page contents. For example, classification extractors can be pushed to the server behind the distance function implementations in situations such as when the server is strongly backed by a web-search infrastructure and the URL being browsed not being content dynamic.

Authentication Modules 414 can authenticate, for example, users, communities, or automated Bot(s). Distance evaluation modules 416 compare the collaboration goals of people and/or communities and/or programs (bots) and form (and return) dynamic groups of users based on similarities of goals. For example, a browser event impacting a collaboration goal is pushed through to evaluate any change in corresponding user's inclusion and/or exclusion, in and/or from dynamically formed groups. Multiple such modules may be plugged in to the server, wherein the server will evaluate all of them. Also, communities and/or program bots may statically register their collaboration goals is with the server.

Chat and/or collaborate modules 418 implement an AJAX and/or comet and/or continuations based chat framework on the web, and allow basic individual and/or group chat capabilities amongst the users and/or bots dynamically grouped together by the distance evaluation modules.

Figure 5:
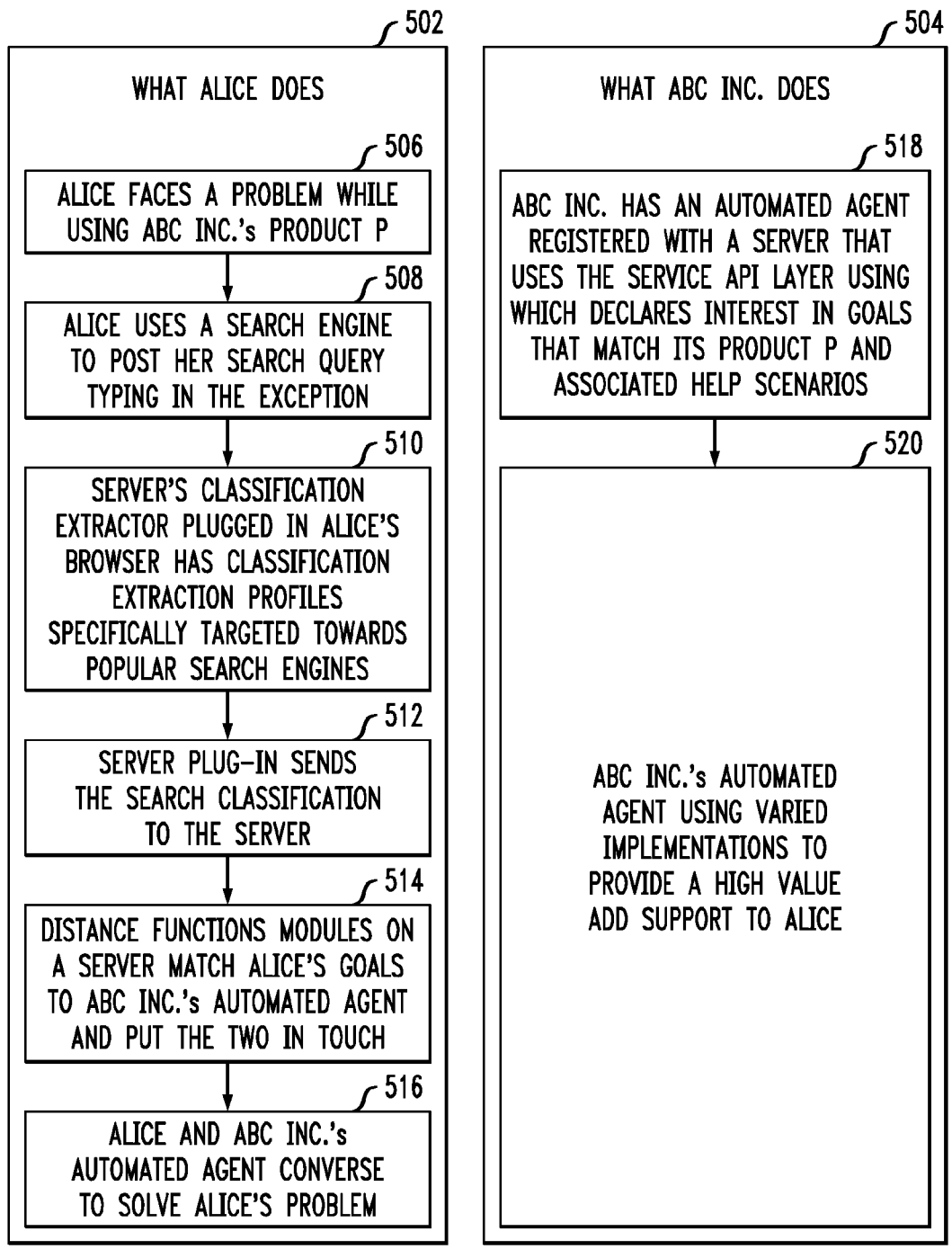
FIG. 5 is a diagram illustrating a discovered help-desk scenario, according to an embodiment of the present invention.

FIG. 5 is a diagram illustrating a discovered help-desk scenario, according to an embodiment of the present invention. By way of illustration, FIG. 5 depicts progression 502, "What Alice does," and progression 504, "What ABC, Inc. does." Progression 502 includes the following steps. Step 506 includes Alice facing a problem while using ABC Inc.'s product P. Step 508 includes Alice using a search engine to post her search query typing in the exception. Step 510 includes a server's classification extractor plugged in Alice's browser having classification extraction profiles specifically targeted towards popular search engines. Step 512 includes a server plug-in sending the search classification to the server. Step 514 includes distance functions modules on a server matching Alice's goals to ABC Inc.'s automated agent and putting the two in touch. Step 516 includes Alice and ABC Inc.'s automated agent conversing to solve Alice's problem.

Progression 504 includes the following steps. Step 518 includes ABC Inc. having an automated agent registered with a server that uses the service API layer, using which declares interest in goals that match its product P and associated help scenarios. Step 520 includes ABC Inc.'s automated agent using varied implementations to provide a high value add support to Alice. For example, possible implementations are an automated agent implementing a chat API protocol, using ABC's instant messaging and/or broadcasting framework to convey incoming chat messages to the support-groups that are most relevant to the incoming request, and it acting as a middle-man transforming between messaging and ABC's messaging protocols.

One or more embodiments of the present invention can be used to bring together people browsing similar content on the worldwide web (WWW). Users browsing similar content are made visible to each other, and are allowed to communicate in real-time using text messages.

As described herein, a client can be a plug-in that is installed in the browser. In an illustrative embodiment, for the browser for which a client has been built, the techniques described herein (using the service API layer) allows clients to be plugged into any host application. For example, a help-desk may be offering collaboration using techniques from an Eclipse based Integrated Development Environment that a user may be using. Also, for example, the client can reside at the proxy, monitoring hypertext transfer protocol (http) user navigation information, thus making it browser independent, and removing the plug-in installation requirement.

In one or more embodiments of the invention, when using a browser plug-in, a user can log into the server by providing a username and password. As a user navigates the web, the classification extractor in the client automatically detects changes in user context (for example, a web page) and extracts content most relevant currently to the user.

Extracting relevant user content may include, for example, the following steps. The document object model (DOM) can be parsed for the current user page and words contained in paragraphs in the page can be obtained. Words that convey no context information (for example, a, an, the, of, etc.) can be removed. Also, equivalent words can be converted to the same base word (for example, eliminating plurals). Additionally, a count of the unique words in the page can be computed, and words can be sorted by count and a content vector and normalized term-frequency vector (weight vector) of the most frequently occurring terms in the page can be computed.

The content vector and weight vector can be transmitted to the server in order to find other users browsing similar content. If the server finds other users with similar content, it groups them together and sends this information back to the client. The client can allow the grouped users to initiate a real-time text based conversation (for example, through the server). To obtain information about newly matched users and messages from other users, the client can periodically send a refresh message to the server, or depend on server-based facilities such as continuations to receive asynchronous updates.

In one or more embodiments of the present invention, the server maintains the current state for each user logged into the system. The server periodically receives content and term-frequency vectors, and uses this information to group similar users together. A vector model, described below, can be used to match users.

Consider a user, $U_N$, that sends to the server a content vector, $C_N$, that contains k terms, $C_N=(T_{N,1}, T_{N,2} \ldots T_{N,k})$ and a corresponding weight vector, $W_N=(W_{N,1}, W_{N,2} \ldots W_{N,k})$. The server computes the similarity between $U_N$ and any other user ($U_X$) currently logged in to the server, using the following equation:

$$dist(N, X) = \frac{\sum_{i=1}^{k} W_{Ni} \times W_{Xi}}{\left(\sqrt{\sum_{i=1}^{k} W_{Ni}^2} \times \sqrt{\sum_{i=1}^{k} W_{Xi}^2}\right)}$$

The above equation evaluates the degree of similarity between two user vectors, and can be quantified by the cosine of the angle between the vectors. Once the closest user $U_C$ is found (that is, the user with the highest similarity value), the server groups $U_N$ and $U_C$ together and creates a buffer that can be used to communicate between them.

Figure 6:
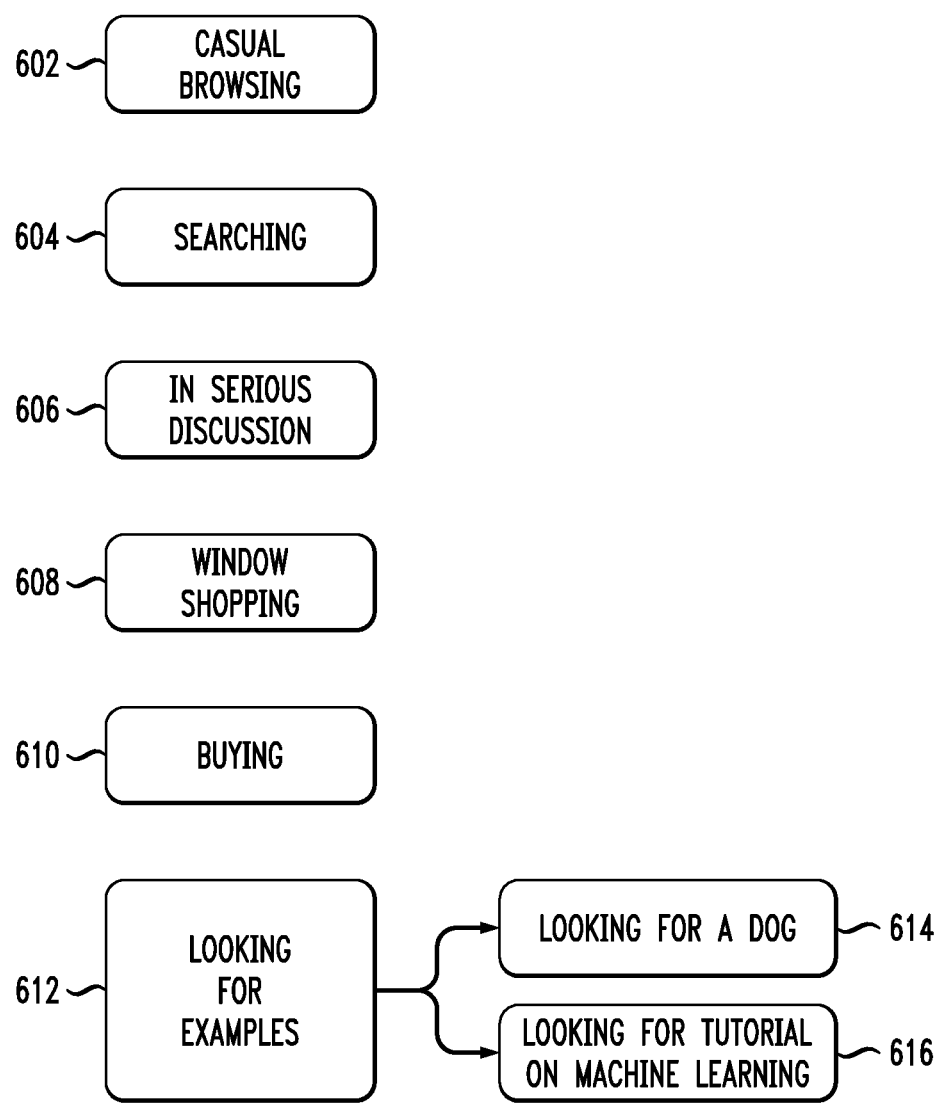
FIG. 6 is a diagram illustrating exemplary user states, according to an embodiment of the present invention.

FIG. 6 is a diagram illustrating exemplary user states, according to an embodiment of the present invention. By way of illustration, FIG. 6 depicts element 602 casual browsing, element 604 searching, element 606 in serious discussion, element 608 window shopping, element 610 buying, element 612 looking for examples, element 614 looking for a "dog," and element 616 looking for tutorial on machine learning.

In one or more embodiment of the invention, users can proactively announce their state, including "intent." The user may explicitly specify an intent and/or goal of what the user is looking for, as illustrated by the examples in FIG. 6. The states of users can provide further semantics to compute the best matching people currently on the web.

Figure 7:
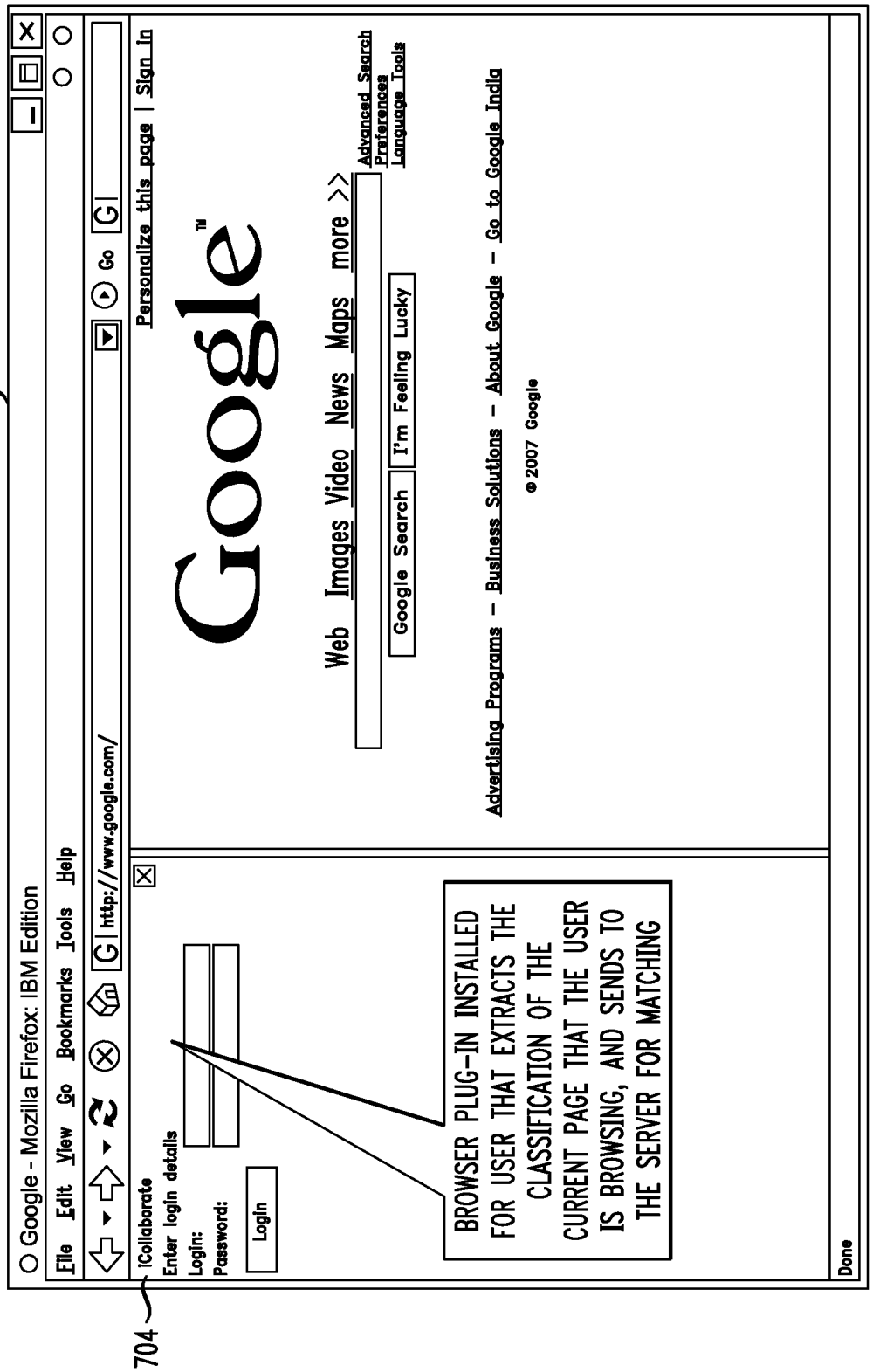
FIG. 7 is a diagram illustrating an exemplary client flow, according to an embodiment of the present invention.
Figure 8:
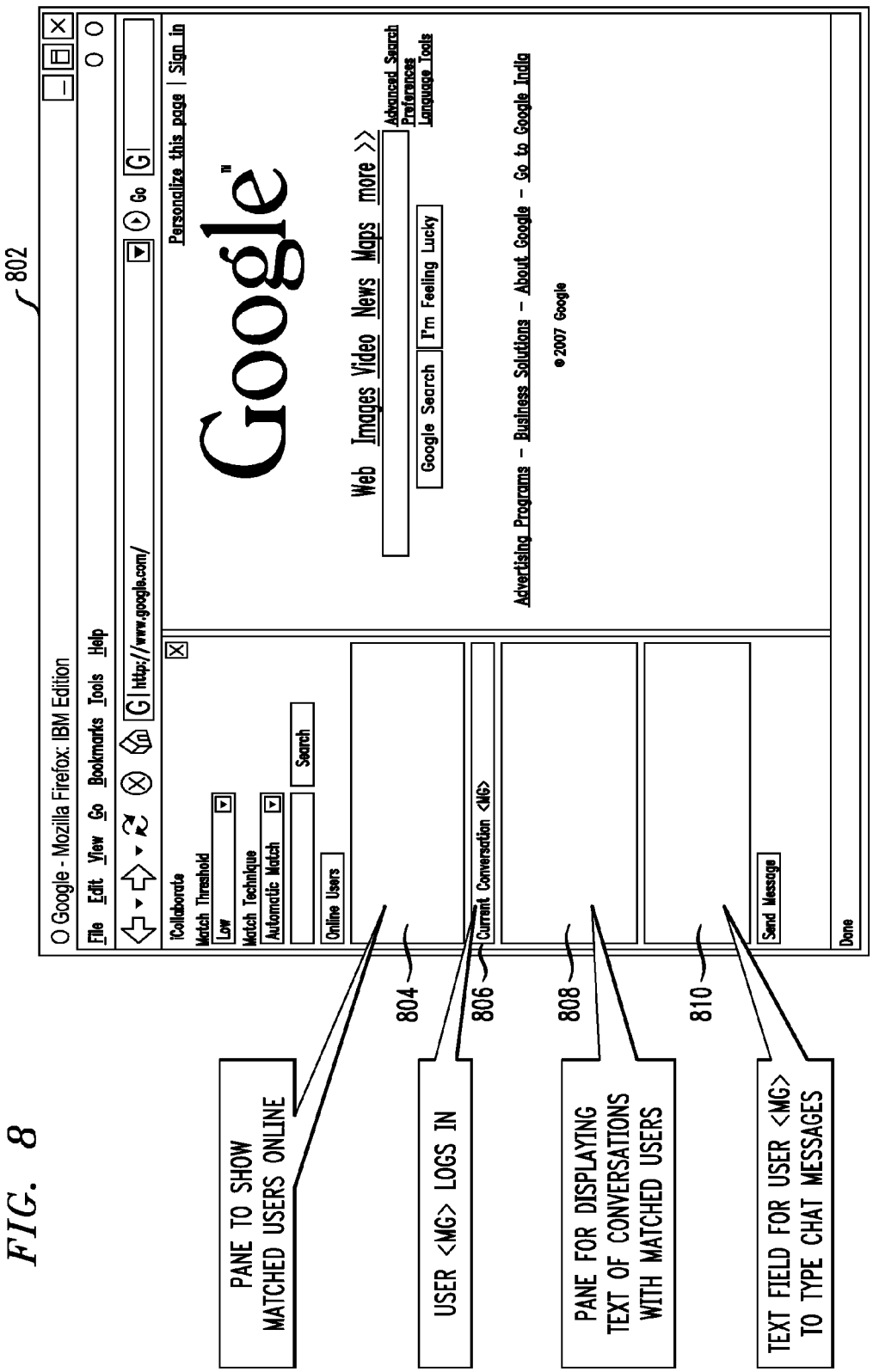
FIG. 8 is a diagram illustrating an exemplary client flow, according to an embodiment of the present invention.

FIG. 7 through FIG. 11 illustrates an exemplary client flow, using a series of screenshots. FIG. 7 is a diagram illustrating an exemplary client flow, according to an embodiment of the present invention. By way of illustration, FIG. 7 depicts screenshot 702, which includes a browser plug-in 704 installed for a user that extracts the classification of the current page that the user is browsing, and sends it to the server for matching. FIG. 8 is a diagram illustrating an exemplary client flow, according to an embodiment of the present invention. By way of illustration, FIG. 8 depicts screenshot 802, which includes a pane 804 to show matched users online, a location 806 for User <MG> log-in, a pane 808 for displaying text of conversations with matched users, and a text field 810 for user <MG> to type chat messages.

Figure 9:
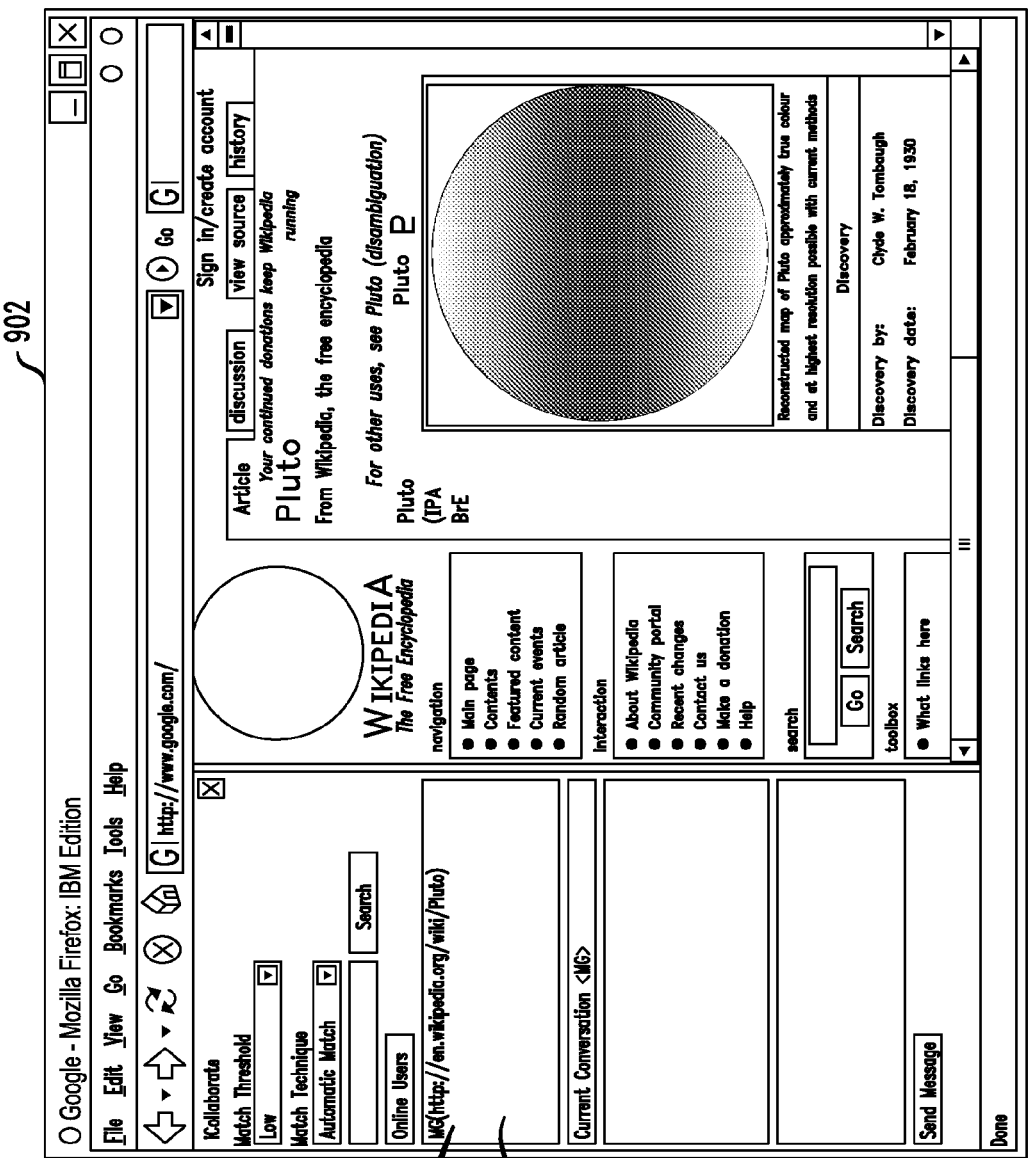
FIG. 9 is a diagram illustrating an exemplary client flow, according to an embodiment of the present invention.
Figure 10:
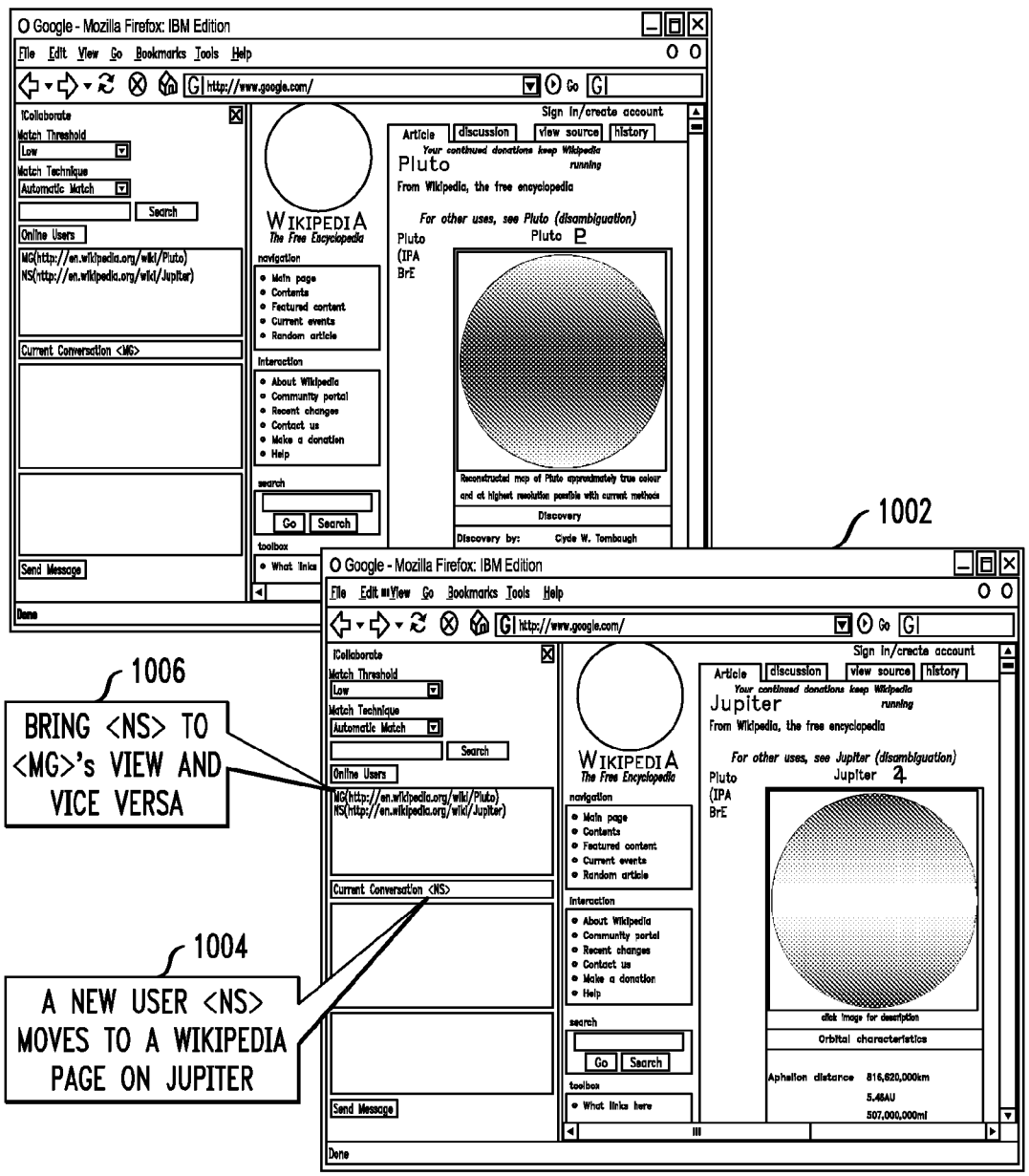
FIG. 10 is a diagram illustrating an exemplary client flow, according to an embodiment of the present invention.
Figure 11:
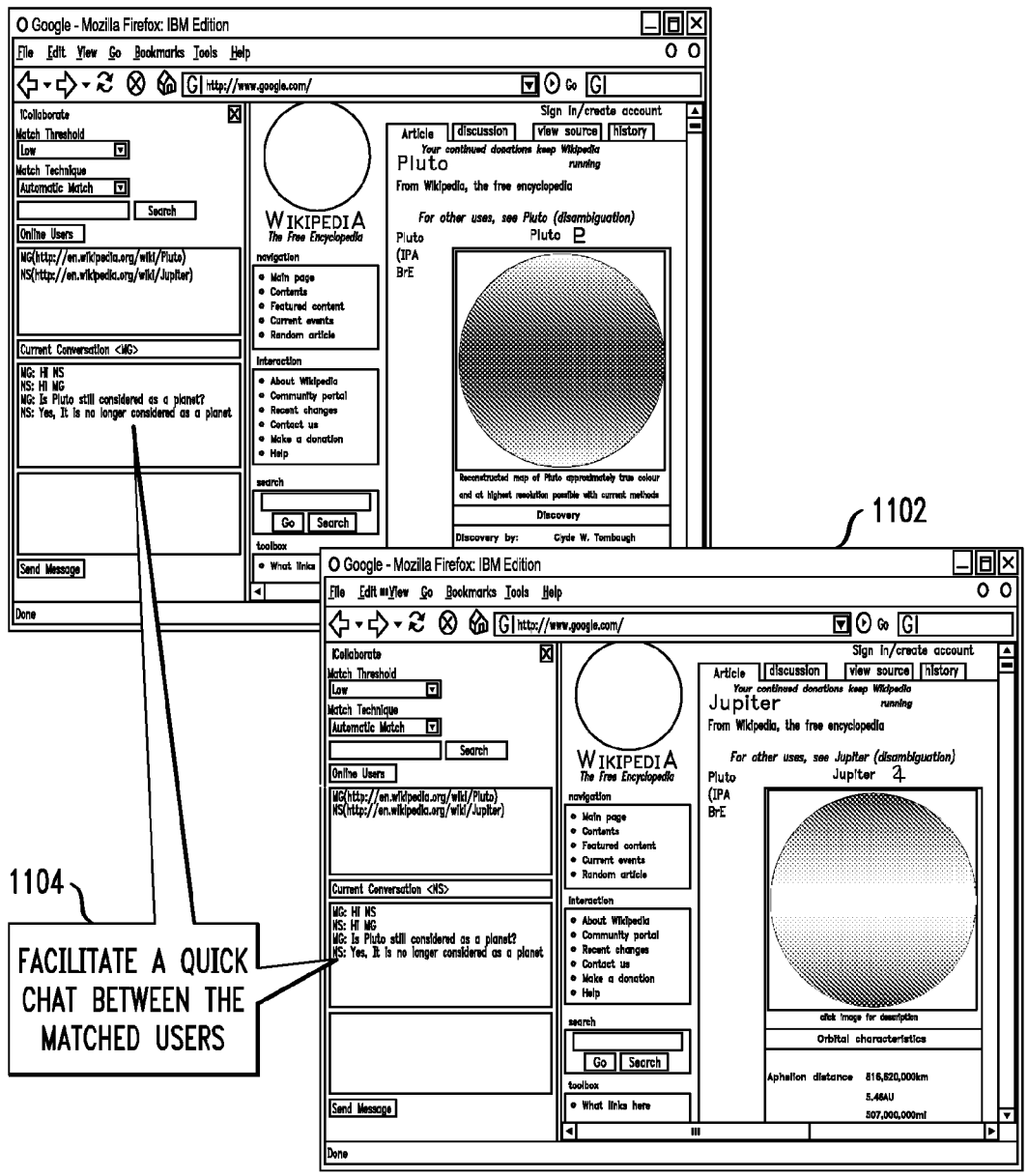
FIG. 11 is a diagram illustrating an exemplary client flow, according to an embodiment of the present invention.

Also, FIG. 9 is a diagram illustrating an exemplary client flow, according to an embodiment of the present invention. By way of illustration, FIG. 9 depicts screenshot 902, which includes a pane 904 for a user <MG> to move to a Wikipedia page on Pluto. FIG. 10 is a diagram illustrating an exemplary client flow, according to an embodiment of the present invention. By way of illustration, FIG. 10 depicts screenshot 1002, which includes a pane 1004 for a new user <NS> moves to a Wikipedia page on Jupiter and a pane 1006 for bringing <NS> to <MG>'s view and vice versa. Further, FIG. 11 is a diagram illustrating an exemplary client flow, according to an embodiment of the present invention. By way of illustration, FIG. 11 depicts screenshot 1102, which includes a pane(s) 1104 for facilitating a quick chat between the matched users.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 12:
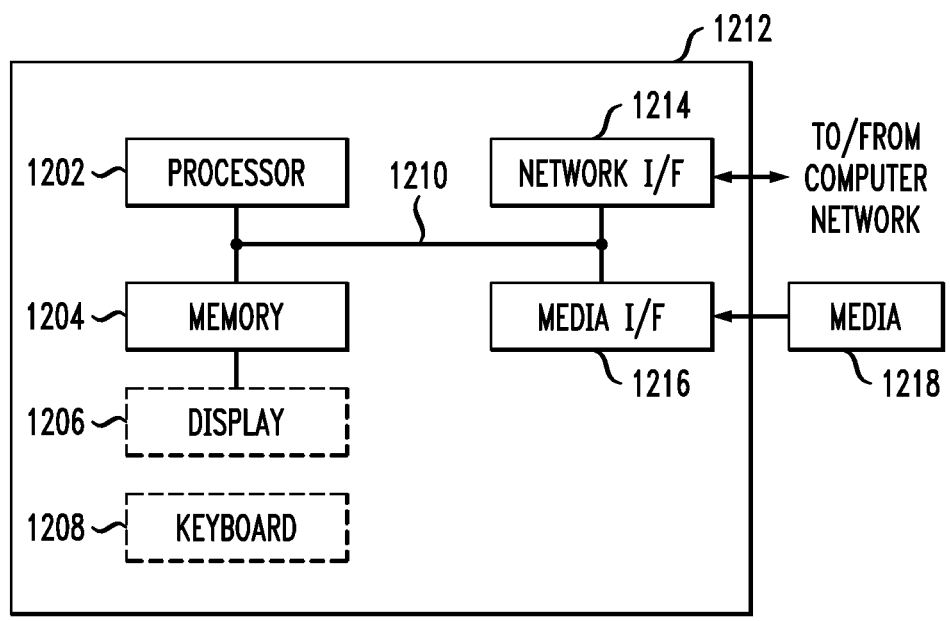
FIG. 12 is a system diagram of an exemplary computer system on which at least one embodiment of the present invention can be implemented.

At present, it is believed that the preferred implementation will make substantial use of software running on a general-purpose computer or workstation. With reference to FIG. 12, such an implementation might employ, for example, a processor 1202, a memory 1204, and an input and/or output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1202, memory 1204, and input and/or output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1218) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1204), magnetic tape, a removable computer diskette (for example, media 1218), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A system, preferably a data processing system, suitable for storing and/or executing program code will include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, utilizing closeness metrics to capture useful relationships between people and determine which relationships were useful in a given situation and/or context.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a non-transitory computer useable readable storage medium having computer useable program code for facilitating a real-time virtual interaction between two or more users, said computer program product including:

computer useable program code for extracting a dynamically changing context from two or more users, wherein the context comprises at least one of user-provided information and one or more items related to at least one of current activity and past activity of the two or more users;

computer useable program code for analyzing the context from each user to create a distinct classification for each user;

computer useable program code for comparing the distinct classification for each user with a distinct classification for each additional user, wherein comparing comprises ordering each user in terms of closeness to each additional user; and computer useable program code for using the ordering of each user in terms of closeness to each additional user to facilitate a real-time virtual interaction between two or more users.

2. The computer program product of claim 1, further comprising computer useable program code for providing each user with privacy control.

3. The computer program product of claim 1, wherein the activity comprises participating in at least one of a web-log (blog), jam, electronic mail (e-mail), wiki, internet browsing, three-dimensional environments, a commerce site, an auction site, content browsing, content manipulation and one or more software development activities.

4. The computer program product of claim 1, further comprising computer useable program code for enabling each user to communicate with each additional user and navigate one or more three-dimensional (3D) environments.

5. The computer program product of claim 1, further comprising computer useable program code for generating a ranking of two or more users for a given context based on a distance function, wherein the distance function depends on a feature vector.

6. The computer program product of claim 1, further comprising computer useable program code for analyzing the context of a user activity to construct at least one of a frequent-term vector and a feature vector for the user activity.

7. The computer program product of claim 1, wherein the computer useable program code for extracting context comprises:
   computer useable program code for parsing a document object model (DOM) for the current user activity;
   computer useable program code for using the parsed DOM to obtain one or more words of text from the activity;
   computer useable program code for removing each word that conveys no context information;
   computer useable program code for removing each set of equivalent words;
   computer useable program code for computing a count of one or more unique words from the activity; and
   computer useable program code for computing a content vector and normalized term-frequency vector of one or more frequently occurring terms.

8. A computer program product comprising a non-transitory computer useable readable storage medium having computer useable program code for generating a database of one or more user classifications, said computer program product including:
   computer useable program code for extracting context from a user, 30 wherein the context comprises one or more items of current activity of the user;
   computer useable program code for analyzing the context from each user to create a distinct classification for each user; and
   computer useable program code for storing the user distinct classification in a searchable database.

9. A system for facilitating a real-time virtual interaction between two or more users, comprising:
   a memory; and
   at least one processor coupled to said memory and operative to:
   extract a dynamically changing context from two or more users, wherein the context comprises at least one of user-provided information and one or more items related to at least one of current activity and past activity of the two or more users;
   analyze the context from each user to create a distinct classification for each user;
   compare the distinct classification for each user with a distinct classification for each additional user, wherein comparing comprises ordering each user in terms of closeness to each additional user; and
   use the ordering of each user in terms of closeness to each additional user to facilitate a real-time virtual interaction between two or more users.

10. The system of claim 9, wherein the at least one processor coupled to said memory is further operative to provide each user with privacy control.

11. The system of claim 9, wherein the at least one processor coupled to said memory is further operative to generate a ranking of two or more users for a given context based on a distance function, wherein the distance function depends on a feature vector.

12. The system of claim 9, wherein the at least one processor coupled to said memory is further operative to enable each user to communicate with each additional user and navigate one or more three-dimensional (3D) environments.

13. The system of claim 9, wherein the at least one processor coupled to said memory operative to extract context is further operative to:
   parse a document object model (DOM) for the current user activity;
   use the parsed DOM to obtain one or more words of text from the activity;
   remove each word that conveys no context information;
   remove each set of equivalent words;
   compute a count of one or more unique words from the activity; and
   compute a content vector and normalized term-frequency vector of one or more frequently occurring terms.

* * * * *